United States Patent [19]

Bernard et al.

[11] 4,367,630
[45] Jan. 11, 1983

[54] SYSTEM FOR RAPIDLY CHILLING CARCASSES

[75] Inventors: Vincent R. Bernard, Dallas County; R. James Ellis, Collin County, both of Tex.; Ivan Rasovich, Los Angeles County, Calif.

[73] Assignee: The Jimmy Dean Meat Company, Inc., Dallas, Tex.

[21] Appl. No.: 186,145

[22] Filed: Sep. 10, 1980

[51] Int. Cl.³ .............................................. F25D 13/06
[52] U.S. Cl. ............................................. 62/63; 62/65
[58] Field of Search ...................... 62/63, 64, 65, 374, 62/375, 380

[56] References Cited

U.S. PATENT DOCUMENTS

| | | | |
|---|---|---|---|
| 3,413,818 | 12/1968 | Pelmulder | 62/374 |
| 3,468,135 | 9/1969 | Doll et al. | 62/63 |
| 3,485,055 | 12/1969 | Webster et al. | 62/63 |
| 3,492,831 | 2/1970 | Maurer et al. | 62/62 |
| 3,769,807 | 11/1973 | Foster | 62/63 |
| 3,831,389 | 8/1974 | Lipona | 62/63 |
| 3,832,864 | 9/1974 | Rasovich | 62/374 |
| 3,976,459 | 8/1976 | Ames | 62/266 |
| 4,028,774 | 6/1977 | Allan et al. | 17/24 |

OTHER PUBLICATIONS

"Ultra-Rapid Chilling of Fresh Meats," Union Carbide Corporation Linde Division, Tarrytown Technical Center, Tarrytown, N.Y., Rev. 6/10/75.

*Primary Examiner*—Ronald C. Capossela
*Attorney, Agent, or Firm*—Richards, Harris & Medlock

[57] ABSTRACT

A system (10) for chilling warm animal carcasses (30) more quickly and without substantial tissue shrinkage from dehydration includes an enclosure (12) defining a first subchamber (24) and a second subchamber (26). The carcasses (30) are conveyed into the first subchamber (24) for liquid immersion into a tank (52) of cryogenic fluid to crust-freeze the exterior carcass portions. Following immersion, the semi-chilled carcasses (30) are held in the second chamber (26) while cryogenically refrigerated, sub-freezing gas is circulated around the carcasses to complete the chilling process.

9 Claims, 3 Drawing Figures

SYSTEM FOR RAPIDLY CHILLING CARCASSES

TECHNICAL FIELD

The present invention relates in general to a system for quickly and efficiently chilling meat. More particularly, this invention concerns a meat chilling process and apparatus wherein warm animal carcasses are crust frozen by substantially total immersion in a bath of cryogenic liquid, followed by placement in an equilibration room cryogenically refrigerated to complete temperature equalization in a chilled condition.

BACKGROUND ART

In the meat processing industry, freshly slaughtered animal carcasses are typically chilled before cutting and further processing. Chilling reduces bacterial growth and retards the onset of spoilage, thereby increasing shelf life of the meat product. A uniform carcass temperature of about 34°-38° F. is generally desired so that the meat and fat are firm enough for smooth cutting. The difficulty of chilling carcasses from a fresh-killed temperature of about 100° F. to a temperature of about 35° F. on a continuous basis with efficiency has been a long-standing problem in the industry.

Various difficulties have been associated with the methods and equipment of the prior art. For example, conventional refrigeration equipment capable of generating low temperatures at high rates is relatively complex and thus expensive and difficult to maintain. Such equipment operates by circulating large volumes of chilled air around carcasses placed in a cooler for extended periods of time on the order of 12 to 16 hours. Since this process is relatively slow, cooler capacity often has been the limiting factor in the output of a meat processing plant. Further, the possibility of bacterial contamination is greatly increased under such conditions, and substantial tissue shrinkage occurs due to surface dehydration of the meat. Although a relatively high humidity is maintained in an attempt to reduce dehydration of the meat, much of the chilling action in such equipment results from evaporation of moisture from the meat's surface. This is a significant problem adversely affecting profitability because about 1%-3% or more of the fresh-killed carcass weight is typically lost to dehydration. In addition to being slow and causing carcass shrink, conventional refrigeration equipment consumes much floor space and is inefficient and costly to operate.

More recently, there have been several attempts to utilize cryogenic fluids in the refrigeration of meat. Cryogenic fluids such as liquid carbon dioxide, air or nitrogen range in temperature between $-100°$ F. and $-400°$ F. and are suitable for use as refrigerants by reason of their high cooling capacities. However, prior attempts to utilize such fluids have been confined primarily to injection of cryogenic liquids into a chamber to effect refrigeration by displacing the gas therein with vaporized cryogenic fluid. For instance, U.S. Pat. No. 3,492,831 to Maurer et al. discloses a meat refrigeration and dehumidification system wherein liquid nitrogen is dispensed and vaporized inside a closed chamber to cool the gas circulated in contact with the meat therein. In U.S. Pat. No. 3,769,807 to Foster, liquid carbon dioxide is injected into an insulated chamber to maintain the atmosphere therein at a desired temperature.

Other approaches have involved direct contact between the meat and cryogenic fluid. Small poultry carcasses are conveyed through a slurry of carbon dioxide particles and gas in U.S. Pat. No. 3,468,135 to Doll et al. Individual cuts of meat are quick frozen by immersion in a cryogenic liquid bath in the machine shown in U.S. Pat. No. 3,832,864 to Rasovich. In addition, there have been attempts to effect chilling by spraying cryogenic fluid directly on substantially whole carcasses. Heretofore, however, there has not been a chilling process involving the step of immersing entire animal carcasses in a bath of cryogenic liquid to accomplish partial chilling, followed by the step of holding the carcasses in chilled gas circulating at a high rate to complete chilling.

Thus, a need has arisen for a more efficient technique for chilling substantially whole carcasses to a desired cooler but unfrozen temperature by means of immersion in an expendable cryogenic fluid.

SUMMARY OF INVENTION

The present invention comprises a system for chilling substantially whole carcasses which overcomes the foregoing and other difficulties associated with the prior art. The objects of the present invention include chilling carcasses quickly and efficiently in minimum space, improving meat quality, extending shelf life of the meat while minimizing weight loss, and achieving these results at lower installation and operating costs.

In accordance with the invention, there is provided an apparatus and method for rapidly chilling freshly slaughtered, warm carcasses to a predetermined equilibration temperature suitable for cutting and further processing. The method herein includes substantially complete immersion of the hot carcasses in a bath of cryogenic fluid to crust freeze the exterior portions and extremities of the carcasses, followed by placement of the semi-chilled carcasses in a cryogenically refrigerated blast cooler to complete chilling to the desired equilibration temperature. The blast cooler is preferably refrigerated by cold gas vaporized from the bath of cryogenic fluid for added efficiency. The invention herein is faster and more economical to operate than the systems of the prior art, and results in chilled carcasses with more uniform temperature distribution therethrough and with substantially negligible tissue shrinkage.

More specifically, the present invention comprises a method and apparatus for rapidly and efficiently chilling freshly slaughtered animal carcasses. The apparatus includes an insulated enclosure or chamber defining an immersion subchamber and a holding subchamber. A conveyor system extends from an entry vestibule in the immersion subchamber to an exit vestibule in the holding subchamber. An open-top tank of cryogenic liquid is provided in the immersion subchamber. A plurality of fans and storage rails are located in the holding subchamber.

The apparatus is particularly suited for operation on a continuous basis. Freshly dressed warm carcasses are conveyed through the entrance and into the immersion subchamber for dipping in the cryogenic liquid for a predetermined time. As each carcass emerges from the immersion subchamber, the exterior portions are crust frozen while the interior portions are partially chilled but remain relatively warm. The semi-chilled carcasses are then conveyed into the refrigerated holding chamber and onto the storage rails. The holding chamber is maintained at a predetermined temperature relatively cooler than the final equilibration temperature desired, and the cold cryogenic fluid vapor is circulated around the carcasses at a high flow rate by fans. In accordance with the preferred embodiment, a partition between the immersion and holding subchambers acts as a baffle so that vapors from boil-off of the cryogenic liquid within the immersion subchamber can be efficiently utilized to refrigerate the holding subchamber. The carcasses are held for a time sufficient substantially to complete chilling to the desired equilibration temperature, after which the chilled carcasses are removed for cutting and further processing.

BRIEF DESCRIPTION OF DRAWINGS

A more complete understanding of the invention can be had by reference to the following Detailed Description in conjunction with the accompanying Drawings.

DETAILED DESCRIPTION

Figure 1:
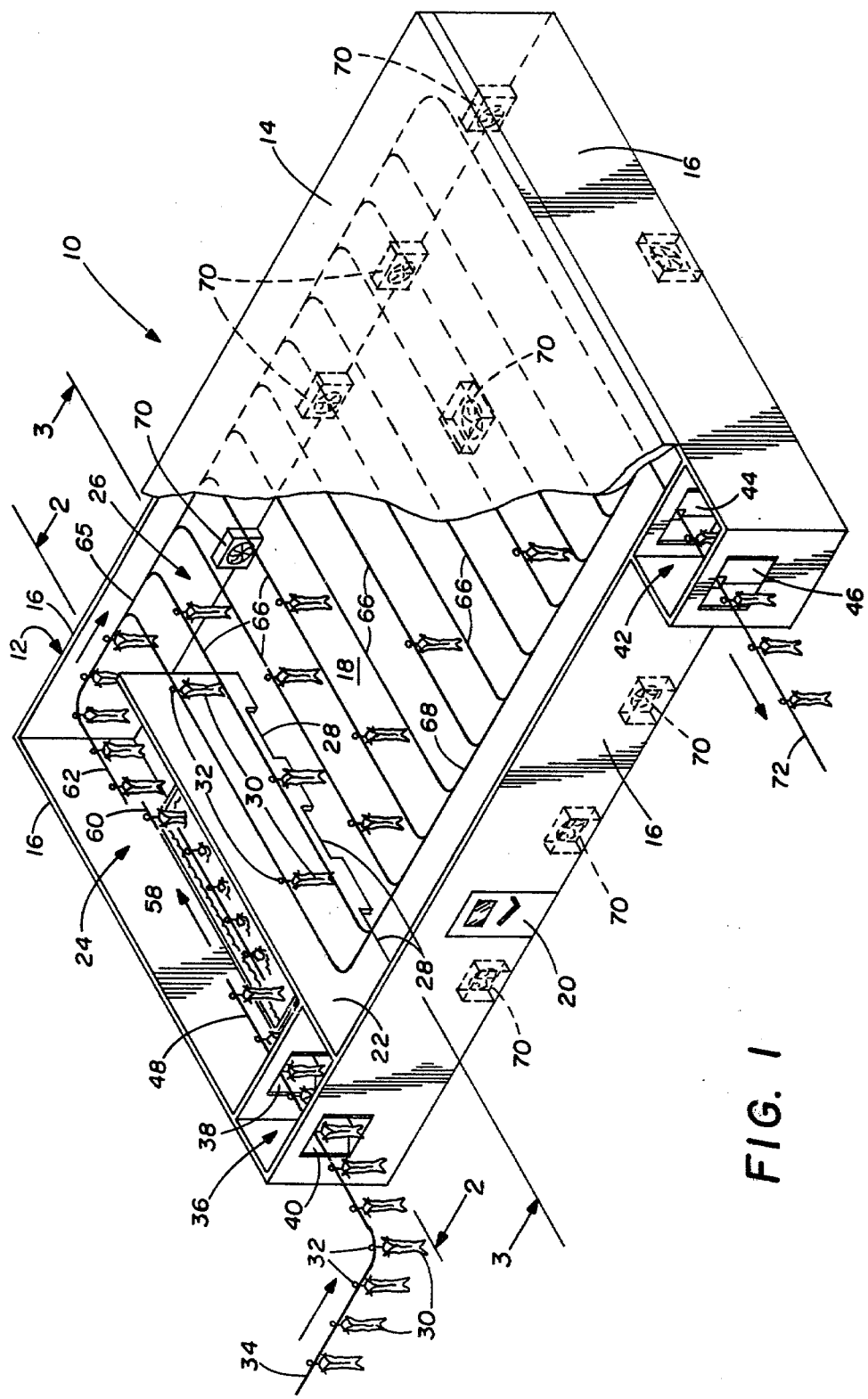
FIG. 1 is a perspective view (partially cutaway) of a system for chilling carcasses in accordance with the invention.

Referring now to the Drawings, wherein like reference numerals designate like or corresponding parts throughout the views, and particularly referring to FIG. 1, there is shown a cooler apparatus 10 representative of the invention. Typically, the cooler apparatus 10 would be incorporated into a meat processing facility wherein live animals are slaughtered, dressed, butchered and processed into various primal cuts of meat.

Cooler apparatus 10 includes an insulated enclosure or chamber 12 comprised of a ceiling 14, walls 16, and a floor 18. Chamber 12 is maintained at substantially atmospheric pressure. A door 20 is provided in one wall 16 of the apparatus 10 for access by personnel, although personnel are not normally inside chamber 12 during operation of the system. Chamber 12 can be of any suitable size depending upon the requirements of the application. For example, chamber 12 can be about 36 feet wide by 55 feet long by 12 feet tall.

A partition 22 divides chamber 12 into an immersion subchamber 24 and a relatively larger holding subchamber 26. Partition 22 extends from one wall 16 of chamber 12 almost completely thereacross with the exception of a passageway adjacent to the opposite wall. In accordance with the preferred construction, openings 28 are provided in partition 22 along floor 18 for reasons to be explained more fully hereinafter.

A series of carcasses 30 supported on conventional trolleys 32 are transported through chamber 12 by means of a conveyor 34. Carcasses 30 can comprise substantially whole beef, hog, sheep, poultry or other types of animal carcasses which recently have been slaughtered and thus retain much of their original body heat. Conveyor 34 is of substantially conventional construction, and may comprise a conveying mechanism of the type having a plurality of spaced fingers for pushing the trolleys 32 along an overhead rail, for example. Conveyor 34 extends through an entry vestibule 36 provided in immersion subchamber 24. Vestibule 36 includes pairs of inner doors 38 and outer doors 40 of the swinging type which are spring loaded to a normally closed position, but which open to allow passage of each carcass 30. An exit vestibule 42 having similar pairs of inner doors 44 and outer doors 46 is provided in holding subchamber 26 at the opposite end of chamber 12.

Figure 2:
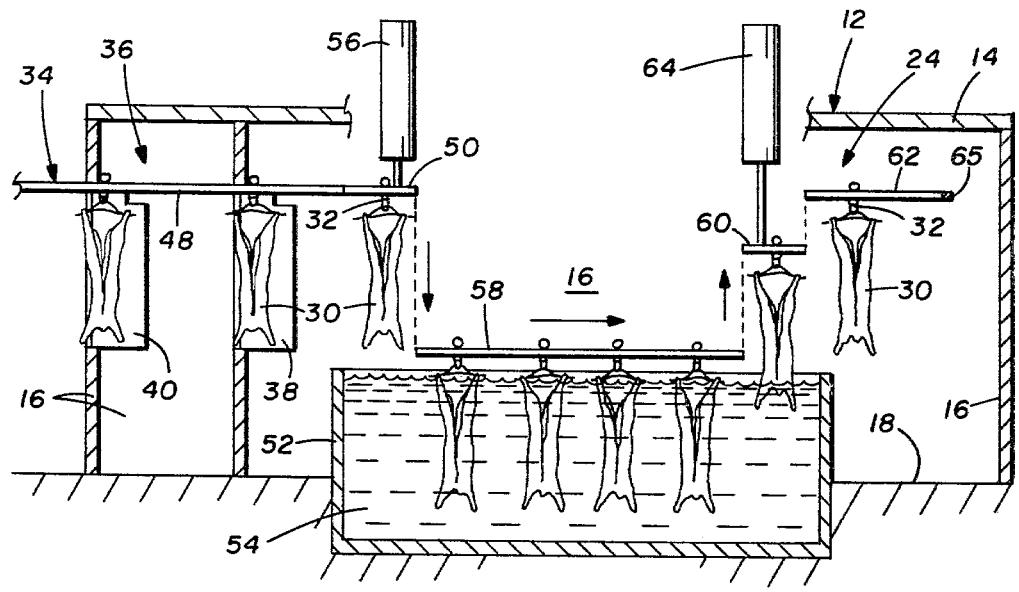
FIG. 2 is a sectional view taken generally along lines 2—2 of FIG. 1 in the direction of the arrows.

FIG. 2 is an enlarged cross-sectional view of immersion subchamber 24 in cooler system 10. Carcasses 30 are conveyed into subchamber 24 along an input rail 48 of the conveyor system 34 from the kill floor (not shown). Carcasses 30 as illustrated comprise substantially whole hog carcasses, however, the invention herein can be used with beef, sheep or other types of animal carcasses.

It will be understood that carcasses 30 are conveyed into immersion subchamber 24 soon after slaughtering and therefore are still at substantially the original body temperature of about 100° F. Carcasses 30 typically arrive at subchamber 24 immediately after slaughtering, evisceration, decapitation and washing. If desired, the hide can be stripped from the carcass beforehand and the backbone split as shown, but, while this is preferable, it is not critical to practice of the invention. The system herein is thus particularly adapted for chilling substantially whole carcasses.

Carcasses 30 are moved by conveyor system 34 along input rail 48 into immersion subchamber 24. A first movable conveyor section 50 located at the end of input rail 48 functions to lower each carcass 30 into a tub or open-top tank 52 filled with cryogenic fluid 54. Fluid 54 can comprise, for example, liquid carbon dioxide, liquid air, liquid nitrogen or other suitable fluid characterized by an extremely low temperature and high cooling capacity. Liquid nitrogen, which has a temperature of about −320° F. and a cooling capacity of approximately 160 BTU/pound in the liquid phase, is the preferred cryogenic fluid because of its inertness and availability. Conveyor section 50 is actuated by a double acting cylinder 56.

Each carcass 30 is then lowered into tank 52 by movable conveyor section 50 and transferred to a fixed conveyor section 58 located immediately above the tank for further conveyance. Each carcass 30 is thus entirely immersed in cryogenic fluid 54 with the exception of the extreme end portions of the legs by which each carcass is attached to its corresponding trolley 32. A second movable conveyor section 60 is provided at the output end of intermediate conveyor section 58 for lifting the carcasses 30 out of tank 52 one by one and transferring the carcasses to an output rail 62. A double acting cylinder 64 or other suitable actuator can be utilized to actuate movable conveyor section 60.

It will thus be apparent that carcasses 30 are substantially completely immersed in cryogenic fluid 54 for a relatively short but sufficient time to crust freeze the outer portions of the carcasses and hard freeze the thin extremities thereof. The temperature level of the interior portions of carcasses 30 is also reduced, but not to the final equilibration level. The time of immersion is a function of the speed of conveyance of the carcasses 30 through tank 52, and, for a cryogenic fluid of liquid nitrogen, can range between about 45 seconds and 2 minutes depending upon the size and type of carcasses being chilled.

Figure 3:
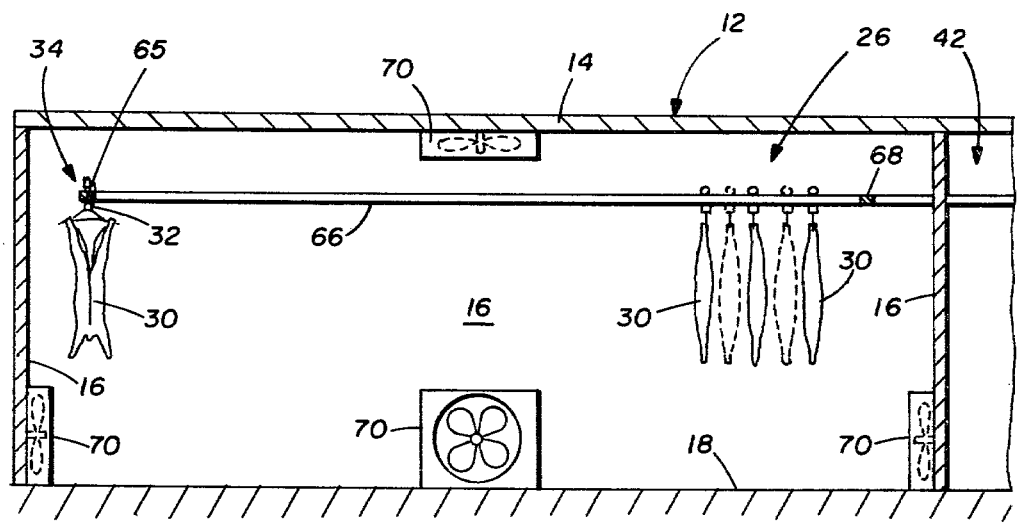
FIG. 3 is a sectional view taken generally along lines 3—3 of FIG. 1 in the direction of the arrows.

Referring now to FIG. 3, after immersion the partially chilled carcasses 30 are conveyed along output rail 62 of immersion subchamber 24 and onto infeed rail 65 extending along one side of holding subchamber 26. Carcasses traveling along infeed rail 65 are directed onto one of a plurality of holding rails 66 extending between the infeed rail and outfeed rail 68 on the opposite side of holding subchamber 26. Holding rails 66 are preferably declined slightly so that trolleys 32 will roll away from infeed rail 65 under gravity until engaging the preceding carcass 30 or appropriate stop structure. A plurality of semi-chilled carcasses 30 are thus stored on each rail 66 wihin holding subchamber 26. Carcasses 30 can be stored in spaced relationship as shown in full lines, or in contacting relationship as shown in full and phantom lines in FIG. 3.

The atmosphere within holding subchamber 26 is maintained at a refrigerated temperature relatively lower than the final equilibration temperature desired, and is vigorously circulated therein by means of fans 70. The temperature in subchamber 26 can range between 10° and 31° F. Holding subchamber 26 can be cooled by conventional refrigeration equipment, but, in the preferred embodiment, is refrigerated by cold gas evolving from immersion subchamber 24. It will be appreciated that a substantial quantity of cold gas is vaporized from tank 52 as carcasses 30 are immersed in the cryogenic fluid 54. For example, in the preferred embodiment wherein fluid 54 comprises liquid nitrogen, the vaporized liquid nitrogen is about −150° to −250° F. in temperature in the gas phase and has substantial cooling capacity. Partition 22 therefore functions as a baffle allowing the cold gas to pass through openings 28 and around the end of the partition into holding subchamber 26, while preventing unnecessary circulation over tank 52 which would cause additional vaporization of cryogenic fluid 54. Each carcass 30 is held in holding subchamber 26 for a time sufficient to complete equilibration. For example, the holding period in subchamber 26 can range from 1 to 3 hours at 28°±3° F. depending upon the size and type of carcasses being chilled.

Several advantages attend the process herein. It will be appreciated that crusted or slightly frozen meat has almost twice the thermal conductivity of unfrozen meat thereby promoting rapid heat transfer. Thus, the rapid circulation of sub-freezing air within holding subchamber 26 maintains the exterior portions of carcasses 30 in a crusted semi-frozen condition and simultaneously allows any hard frozen extremities of the carcasses to thaw somewhat, while simultaneously increasing rapid chilling of the interior portions of the carcasses. It will also be appreciated that the crusted or semi-frozen condition of the exterior portions of carcasses 30 seals the moisture therein, thus preventing any substantial tissue shrinkage from dehydration during the chilling process. The system derives its efficiency by extraction of cooling from both the liquid and gas phases of the cryogenic fluid.

After sufficient time has elapsed for temperature equilibration, carcasses 30 are removed individually from holding subchamber 26 for further processing. Each carcass 30 is released from its corresponding holding rail 66 and directed by outfeed rail 68 onto output rail 72 extending through exit vestibule 42. Equilibrated carcasses 30 are removed from subchamber 26 on a first-in, first-out basis.

If desired, apparatus 10 can be provided with an oxygen analyzer for indicating when it is safe for personnel to enter, and a thermostatically controlled ventilation system for mixing outside air with the cold gas in subchamber 26 as necessary to maintain proper temperature control and/or to purge chamber 12 in the event of an emergency.

EXAMPLE

For a better understanding of the invention, the following example is given. Freshly slaughtered hog carcasses having a dressed weight of about 165 lbs. and a body temperature of about 100° F. were immersed in a bath of liquid nitrogen for about 90 seconds. Following immersion, the crusted and semi-frozen hog carcasses were placed in a chamber refrigerated to a temperature of about 28° F. The cold atmosphere in the chamber was rapidly circulated about these semi-chilled carcasses at a combined flow rate of about 32,000 CFM. The oxygen content of the atmosphere in the holding chamber was about 6%–10% due to boil-off and vaporization of cold nitrogen gas from immersion of the carcasses in the liquid nitrogen tank. The hog carcasses were held in the refrigerated circulation chamber for about 1.5 hours to complete equilibration. Upon removal, the carcasses were sufficiently chilled therethrough to accomplish clean cuts, trims and pulls. Most of the cuts had equilibrated sufficiently to permit cutting and direct packing, however, additional chilling of the hams and sometimes the loins was necessary to achieve a suitable packing temperature below 35° F. It was thus possible within about 2–4 hours to process a hog from the pen into chilled and boxed primal cuts.

In view of the foregoing, it will be understood that the present invention comprises a carcass-chilling method and apparatus incorporating numerous advantages over the prior art. A warm carcass can be chilled for further processing more quickly and economically, and with drastically less tissue shrinkage from dehydration. Other advantages of the invention will suggest themselves to those skilled in the art.

Although preferred embodiments of the invention have been illustrated in the accompanying Drawings and described in the foregoing Detailed Description, it will be understood that the invention is not limited to the embodiments disclosed, but is intended to embrace any equivalents, modifications and rearrangements of elements falling within the spirit and scope of the invention as defined by the following claims.

We claim:

1. A method of chilling a fresh-killed carcass at substantially original body temperature to a temperature slightly above freezing, comprising the steps of:
    (a) providing an enclosure including a first subchamber with a tank of cryogenic liquid therein, and a second subchamber filled with circulating vapors liberated from the tank of cryogenic liquid;
    (b) advancing the carcass into the first subchamber and over the tank of cryogenic liquid;
    (c) lowering the carcass into the tank of cryogenic liquid;
    (d) lifting the carcass out of the tank of cryogenic liquid after a time sufficient to crust-freeze exterior portions of the carcass;
    (e) advancing the carcass into the second subchamber;
    (f) holding the carcass in the second subchamber and the circulating vapors liberated from the tank of cryogenic liquid for a time sufficient to chill the interior portions of the carcass and accomplish substantial equilibration thereof; and
    (g) removing the carcass from the second subchamber for further processing.

2. The method of claim 1, where in step (a) the cryogenic liquid comprises a liquid selected from the group consisting of liquid nitrogen, liquid air, and liquid carbon dioxide.

3. The method of claim 1, wherein the carcass comprises a hog carcass, and where in step (d) the time of immersion of the carcass in the cryogenic liquid is between about 45 seconds and 2 minutes.

4. The method of claim 1, where in step (a) the temperature of the liberated vapors is between about 10° and 31° F.

5. The method of claim 1, wherein the carcass comprises a hog carcass, and where in step (f) the time of holding the carcass in the second subchamber is between about 1 and 3 hours.

6. A method of chilling a fresh-killed hog carcass to an equilibration temperature of between about 35° and 38° F., comprising the steps of:
   (a) immersing the hog carcass in liquid nitrogen for a time sufficient to crust-freeze exterior portions of the carcass;
   (b) removing the carcass from the liquid nitrogen;
   (c) circulating cold nitrogen gas liberated from the liquid nitrogen having a temperature of between about 26° and 31° F. around the hog carcass for a time sufficient to chill the interior portions of the carcass and accomplish substantial equilibration thereof; and
   (d) removing the hog carcass from the circulating cold nitrogen gas for further processing.

7. The method of claim 6, where in step (a) the hog carcass is substantially entirely immersed in the liquid nitrogen.

8. The method of claim 6, where in step (a) the time of immersion of the carcass in the liquid nitrogen is between about 45 seconds and 2 minutes.

9. The method of claim 6, where in step (c) the time of circulation of the cold nitrogen gas around the carcass is between about 1 and 3 hours.

* * * * *